May 22, 1951 W. G. ROMAN ET AL 2,554,267
ELECTRONIC CONTROL SYSTEM FOR RECTIFIER LOAD CIRCUITS
Filed Aug. 20, 1948 3 Sheets-Sheet 3

WITNESSES:
Robert C. Baird
Wu. C. Groome

INVENTORS
Walter G. Roman &
Richard C. Cunningham.
BY
C. M. Avery
ATTORNEY

Patented May 22, 1951

2,554,267

UNITED STATES PATENT OFFICE 2,554,267

ELECTRONIC CONTROL SYSTEM FOR RECTIFIER LOAD CIRCUITS

Walter G. Roman and Richard C. Cunningham, Buffalo, N. Y., assignors to Westinghouse Electric Corporation, East Pittsburgh, Pa., a corporation of Pennsylvania Application August 20, 1948, Serial No. 45,284

11 Claims. (Cl. 318—269)

Our invention relates to electronic systems for controlling the load current or voltage of discharge rectifiers that energize a direct-current load from an alternating-current supply. In a more particular aspect, the invention concerns control systems for operating direct-current motors under controlled and regulated speed or torque conditions.

In such systems, the motor or other load is supplied with current through rectifying tubes of the gas discharge type, such as thyratrons or ignitrons, whose control circuit is impressed by controlled voltages for shifting the firing point of the rectifier tubes relative to the cycle period of the alternating plate voltage, thus controlling the magnitude of the rectified current that passes through the tubes. In this manner, for instance, the speed of a motor to be controlled is adjusted and regulated in accordance with a desired speed value.

Known systems of this type are equipped with electronically operating current limit means that respond to the current in the armature circuit of the motor and act on the grid control of the armature rectifier tubes so as to prevent the armature current from substantially exceeding a given value. As a result, the current limit means prevent excessive overloads damaging to the rectifier tubes and also control the acceleration of the motor during starting periods or periods of rapid changes in speed. It is an object of our invention to improve and simplify such systems relative to the just-mentioned current limit means so as to obtain a secure and readily adjustable current limitation with the aid of simpler and less expensive electronic and associated circuit devices than hereto necessary for this purpose.

In known systems, the control circuit of the armature rectifier is usually impressed with a periodic grid bias which is synchronous with the anode voltage and dephased relative thereto. This grid bias is the resultant of an alternating voltage and a constant unidirectional voltage. In addition, a variable direct-current voltage is used for shifting the rectifier firing point; and several constant and variable bias voltages are applied to the grid circuit of an amplifier tube that controls the just-mentioned direct-current voltage. It is also an object of the invention to simplify the circuit means for providing these various control and grid voltages. More specifically, it is an object of the invention to have a single direct-current source of constant voltage provide all constant or adjustable direct-current voltages needed in the system.

Another object, relating to motor control, is to devise a system of the above-mentioned kind in which, in addition to an electronic control and regulation of current and voltage of the motor armature circuit, an increased speed range is provided by means of electronic field control, and in which the appertaining field rectifier is grid controlled by adjustable voltage also derived from the above-mentioned single direct-current source of constant voltage, thus affording an additional simplification of such field-controllable drive systems.

These and other objects, as well as the means provided by an invention for achieving them, will be apparent from the following description of embodiments of the invention in conjunction with the drawings in which.

Thus these examples of systems according to the invention also differ from one another in other respects as will be pointed out hereinafter.

Figure 1:
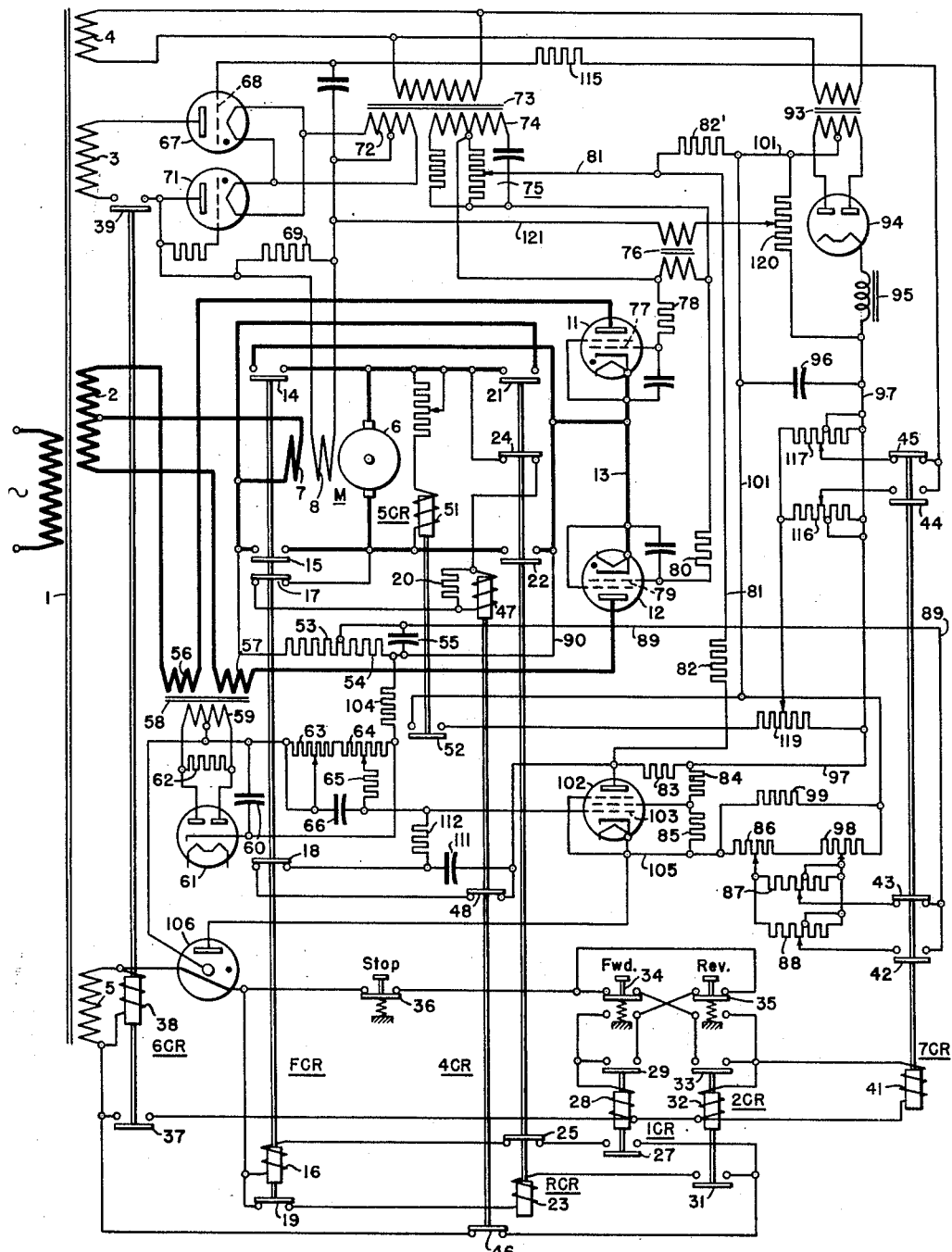
Figure 1 shows the circuit diagram of an electronic control system designed for reversible operation and field control of a direct-current motor.

In the description of Figure 1 following presently, parenthetical references are given to specific commercial type designations of electronic tubes and to numerical values of resistances and voltages. These designations and numerical values are in accordance with a control system that was built and successfully operated. It will be understood, however, that these references are given merely by way of example and that suitable tubes of different values may be employed, depending upon the requirements, desiderata and selected circuit connections of each particular application. The circuit parameter values in particular should be considered to exemplify orders of magnitude or suitable relative dimensions rather than obligatory quantities.

The system, according to Figure 1, is energized from an alternating-current line through a main transformer 1, with secondary windings 2 (600 volts), 3 (580 volts), 4 (100 volts) and 5 (110 volts). The direct-current motor M (e. g. 3 H. P.) to be controlled has its armature 6 energized from the secondary winding 2 and is equipped with a series field winding 7, such as an interpole or compensating winding, and with a separately excited main field winding 8.

The armature circuit of the motor includes two controllable rectifier tubes 11 and 12. These tubes consist preferably of thyratrons (type WL–672). For large motors, ignitrons may be used instead, and the firing angle of the ignitrons may then be controlled by thyratrons whose control or grid circuits are then designed and operative in the manner described below. The tubes 11 and 12 have a common cathode lead 13 in connection with one terminal of the armature 6. The other armature terminal is connected to the midpoint of the secondary 2. The respective anodes of tubes 11 and 12 are in connection with the two end points of the secondary 2 respectively.

The armature circuit is controlled by reversing contactors FCR and RCR which are mutually interlocked so that only one of them is energized at a time. The main contacts 14 and 15 of contactor FCR are controlled by a coil 16 which actuates also three auxiliary contacts 17, 18 and 19. The main contacts 21 and 22 of contactor RCR are controlled by a coil 23 which also actuates auxiliary contacts 24 and 25. The coil circuit for contactor FCR extends through a contact 27 of a control relay 1CR with a coil 28 and an interlock contact 29. The coil circuit for contactor RCR is controlled by the contact 31 of another control relay 2CR with a coil 32 and an interlock contact 33. The coil circuits of relays 1CR and 2CR include a "forward" push-button contact 34 and a "reverse" push-button contact 35, respectively, and are energized from the secondary 5 through a normally closed "stop" contact 36. The coil circuits of relays 1CR and 2CR also include the normally open contact 37 of relay 6CR whose coil 38 is energized from secondary 5 whenever the transformer 1 is energized. Relay 6CR has another normally open contact 39 in the circuit of the secondary winding 3. Energized from the secondary 5 of transformer 1 is also the coil 41 of a relay 7CR with contacts 42, 43, 44 and 45. The coil circuits for contactors FCR and RCR include a normally closed contact 46 of a relay 4CR whose control coil 47 is energized by the armature voltage of motor M and actuates also an interlock contact 48. Relay 4CR picks up whenever the armature voltage exceeds a given low value. Consequently, the polarity of connection of the armature can be reversed by relay FCR or RCR only when the armature voltage and motor speed have dropped below a predetermined value at which the contact 46 is closed. Another voltage relay 5CR has its coil 51 connected across the motor armature 6 so that its contact 52 closes when the armature voltage exceeds a given value which may be different from the above-mentioned pick-up voltage of relay 4CR.

Two resistors 53 and 54 (together 15,000 ohms) are series-connected with each other across the armature 6 whenever either of contacts FCR and RCR is in picked-up condition. The two resistors 53 and 54 form a voltage divider so that the voltage drop across the resistor 53 has a given proportion to the armature voltage of the motor. As will be explained in the following, this voltage drop is effective in the tube control circuits for controlling and regulating the motor speed. A filtering capacitor 55 (2 mfd.) is connected across resistor 54.

Connected between the anodes of tubes 11 and 12 and the respective ends of the secondary 2 are two primary windings 56 and 57 of a current transformer 58. The secondary winding 59 of transformer 58 thus provides a voltage proportional to the current or IR drop in the armature circuit. This voltage is rectified by a twin rectifier 61 (type 6X5) which is connected to secondary 59 in parallel to a load resistor 62 (100,000 ohms). The rectified voltage is impressed across the series arrangement of two rheostats 63 (5,000 ohms) and 64 (500 ohms). A resistor 65 (10,000 ohms) is series-connected to the adjustable tap of rheostat 64. The voltage taken from across the adjusted portion of rheostat 64 is also effective in the tube control circuits in order to provide a reference voltage proportional to the IR drop in the motor armature circuit and also for the purpose of a current limiting and acceleration control, as will also be explained below. A capacitor 66 (.1 mfd.) is series-connected with resistor 65 across a portion of rheostat 63 and a portion of rheostat 64 and is also effective for current limit control, as will also be pointed out in a later place.

The main field winding 8 of motor 6 is energized from the transformer secondary 3 through a controllable rectifier tube 67 (type WL-5557) whose control grid is denoted by 68. A load resistor 69 (6,000 ohms) is connected in parallel to field winding 8. Another rectifier tube 71 (type WL-866A) is connected across the field winding 8 in order to permit the field current to persist during the non-conductive intervals of the rectifier tube 67. In this manner, the field winding 8 is energized by substantially full-wave rectified current despite the fact that only the tube 67 is subject to grid control. Heating current for the cathodes of tubes 67 and 71 is supplied from the mid-tapped secondary 72 of an auxiliary transformer 73 whose primary is energized from the secondary 4 of the main transformer 1. Transformer 73 has another mid-tapped secondary 74 which forms part of a phase shift circuit 75 that is attached to a grid transformer 76.

Transformer 76 forms part of the control or grid circuits of the armature rectifier tubes 11 and 12. One end of transformer 76 is attached to th control grid 77 of tube 11 through a resistor 78 (220,000 ohms). The other end of transformer 76 is attached to the control grid 79 of tube 12 through a resistor 80 (220,000 ohms).

The control circuit for tubes 11 and 12 extends from a center tap of the phase shift circuit 75 through a lead 81 and a resistor 82 (100,000 ohms) to a load resistor 83 (20,000 ohms) and thence through resistors 84 (2,500 ohms) and 85 (1,000 ohms), to a potentiometer rheostat 86 (500 ohms) and from the tap of this rheostat through an adjusted portion of a speed control rheostat 87 (25,000 ohms) or a parallel connected control rheostat 88 (25,000 ohms) depending upon whether the contact 43 or the contact 42 of relay 7CR is closed. From relay contact 43 or 42, the control circuit for the armature rectifier tubes 11 and 12 extends through a lead 89 and through the resistor 54 to a lead 90 which is connected with the common cathode lead 13 of tubes 11 and 12.

The just-mentioned control circuit for armature rectifier tubes 11 and 12 includes the following sources of component grid voltage:

(a1) The first source is represented by the phase shift circuit 75 and the appertaining grid transformer 76. This source impresses on the grids of the two tubes an alternating component grid voltage which is about 90° dephased relative to the anode voltage of the respective tubes.

(a2) A second source of component grid voltage is represented by the totality of series-connected resistors 82, 84, 85 which provide a direct-current bias voltage essentially controlled by the voltage drop across the resistor 82 while the voltage drop across resistors 84 and 85 is negligible for the control circuit of the armature rectifiers and serves to provide a constant bias for the screen grid of the master control tube 102 described below. The just-mentioned resistors are impressed by voltage derived from a transformer 93 whose primary is connected to the secondary 4 of the main transformer 1. The secondary voltage (1,080 volts) from transformer 93 is rectified by a twin diode 94 (type 5Y3) and smoothed by means of a filtering reactor 95 (10 henrys) and a filter capacitor 96 (mfd.). The filtered direct-current voltage is applied through a lead 97 across a potentiometric resistance circuit which includes the resistors 84 and 85 in series with the rheostat 86 and in series with another rheostat 98 (2,500 ohms) the rheostats 86 and 98 being parallel by a resistor 99 (3,000 ohms). The common terminal of rheostat 98 and resistor 99 is connected by a lead 101 to the other pole of just-mentioned rectifier and filter equipment. The resistor 82 is series-connected with a resistor 82' and is disposed between the grid lead 81 of the armature rectifiers and the negative end of the resistor 83. Resistor 82' is connected to the negative end of the constant voltage source (rectifier 94). The resistors 82 and 82' form together a voltage divider which is connected in series with the load resistor 83 across the constant voltage source. This permits the grid lead 81 to go negative as well as positive with respect to the cathode leads 13 and 90 of the armature rectifiers. Thus full control of the armature rectifier tubes is obtained without auxiliary bias supplies.

(a3) A third source of component grid voltage for the armature rectifier tubes is represented by the load resistor 83. The voltage impressed on the control circuit from across resistor 83 is unidirectional and of variable magnitude. It raises or lowers the above-mentioned periodic grid bias and thereby advances or delays the firing points of tubes 11 and 12, thus varying the voltage applied to the motor armature to control the motor speed. The speed control voltage from across resistor 83 is produced and controlled in the following manner. Resistor 83 is connected as a load in the plate circuit of a master control tube 102 which operates as an amplifier and consists preferably of a vacuum tube, such as a pentode (type 6V6). The control grid of the master tube 102 is denoted by 103. The plate circuit of tube 102 extends in series through resistors 83, 82 and 82' and is energized from the constant voltage supply (rectifier 94, etc.). It will be recognized that the voltage drop across the load resistor 83 depends upon the conductance of the master tube 102 and, consequently, upon the voltage conditions in the master tube grid circuit of the master tube 102 which will be described in a later place.

The above-mentioned three voltage sources (a1), (a2), (a3) are the only ones that essentially determine the operating condition of the armature rectifier tubes 11 and 12. Therefore, the operation of these tubes depends substantially only on the voltage drop across the load resistor 83 and hence on the grid control condition of the master tube 102. This is true, despite the fact that two other sources of voltage may be recognized in the control circuit of the armature rectifier tubes. One of these other sources is represented by the resistor 54 which, as explained above, is impressed by voltage derived from across the motor armature. Another source of voltage is represented by the speed control rheostat 88 or 87. These rheostats are impressed by a voltage which is derived from the above-described rectifier and filter circuits including the tube 94. However, the voltages across resistor 55 and across rheostat 88 or 87 are of a smaller order of magnitude than the three voltages from the above-mentioned sources (a1), (a2) and (a3). Besides, the two additional voltages oppose and normally substantially cancel each other. Consequently, the two additional voltages have no appreciable control effect on the armature rectifier tubes and may be neglected in the further consideration of the control performance of the control circuit for the armature rectifier tubes.

It has been mentioned that the conductance of armature rectifier tubes depends essentially only on the voltage variations across the resistor 83 which, in turn, are controlled by the voltage conditions in the grid circuit of the master tube 102. The master tube grid circuit extends from grid 103 through the resistor 65 to the tap of the voltage dividing rheostat 64, thence through a resistor 104 (220,000 ohms) and through the resistor 54 to the lead 89 and through contact 42 or 43 to the tap of the speed control rheostat 88 or 87 and then through part of rheostat 86 to the cathode lead 105 of the master tube 102.

This master tube grid circuit can be recognized to include four series-connected sources of component grid voltage:

(b1) A first source is represented by the speed control rheostat, for instance, the rheostat 88, when contact 42 is closed. The tapped-off portion of rheostat 88 provides a constant unidirectional voltage whose selected magnitude determines the speed at which the motor is supposed to run.

(b2) The second source of grid voltage for the master tube is represented by the resistor 54. As explained previously, the voltage across this resistor is proportional to the armature voltage of the motor. The polarity of connection is such that the voltage from resistor 54 is in series opposition to the speed control voltage from rheostat 88. When the motor is running at the speed set by the rheostat 88, the two voltages from sources (a) and (b) cancel each other to such an extent that a resultant small negative bias, for instance, of a few volts is impressed on the master tube 102 substantially as needed to maintain the voltage drop of resistor 83 and the firing points of the armature rectifiers 11, 12 at values corresponding to the correct motor speed. If the motor runs too fast, the resultant bias voltage on the grid 103 or master tube 102 becomes more negative so that the voltage drop of resistor 83 is changed toward delaying the firing point of the armature rectifiers, thus returning the motor armature voltage and hence the motor speed to substantially the correct value. If the armature voltage drops below the proper value, the reverse control action takes place so that the armature rectifier tubes advance their firing points and increase the armature voltage and motor speed to restore the proper running conditions.

(b3) The third source of voltage in the master tube grid circuit is represented by the active portion of the rheostat 64. As explained previously, the voltage across this rheostat is proportional to the IR drop in the armature circuit. The polarity of connection is such that this voltage has a corrective effect on the resultant grid voltage of the master tube. In this manner, the system provides an automatic IR drop compensation so that the motor speed remains constant at a value exclusively determined by the selected setting of the slider of control rheostat 88. Consequently, this rheostat can be calibrated in terms of motor speed. The resultant of the voltages from sources (b2) and (b3) is proportional to the motor speed regardless of the load or torque imposed on the motor within the rated range of loads. It will, therefore, be understood that sources (b2) and (b3) may be replaced by some other suitable source of a speed-proportional voltage, for instance, by a tachometer generator.

(b4) Another source of voltage in the master tube grid circuit is represented by the resistor 65. The voltage drop across this resistor changes only during accelerating periods and has merely a corrective effect which will be explained in a later place.

Before describing the performance of the system as a whole, the control circuit associated with the grid 68 of the field rectifier tube 67 will first be described. The grid circuit for tube 67 extends through a resistor 115 (47,000 ohms) and through one of the contacts 44 and 45 through a tapped-off portion of a rheostat 116 or 117 (each 100,000 ohms), thence through the lead 97 and a portion of a rheostat 120 (270,000 ohms) through a winding of transformer 76 and lead 121 to the midpoint of the transformer winding 72 and thence to the cathode of tube 67.

This field rectifier grid circuit includes three sources of component grid voltage:

(c1) One source is represented by the transformer 76. It impresses on the grid circuit of the field rectifier a component alternating voltage of about 90° phase lag relative to the anode voltage from transformer secondary 3.

(c2) A second source of grid voltage for the field rectifier is represented by the tapped-off portion of rheostat 120. This rheostat is impressed by constant rectified voltage from rectifier 94, and consequently supplies a constant grid bias.

(c3) The third source of grid voltage is represented by rheostat 116 (or 117). Rheostats 116 and 117 are connected across an adjusted portion of rheostat 119 which, in turn, is connected through contact 52 across the output terminals of rectifier 94. The tapped-off portion of rheostat 116 or 117 provides an adjustable direct-current bias whose magnitude determines the amount of excitation applied to the motor field winding 8. In this manner, the field excitation can be controlled and varied by changing the adjustment of rheostat 116 in order to increase the available range of motor speeds.

When the "forward" push button 34 is actuated, relay 1CR picks up and seals itself in by closing its contact 29. Contact 27 closes the coil circuit of contactor FCR which closes the armature circuit at contacts 14, 15 and connects the resistors 53, 54 across the armature so that a portion of the armature voltage appears across resistor 54. Neglecting the IR drop compensation and the current limit control which will be discussed later, the voltage between the cathode lead 105 of the master tube 102 and the slider on potentiometer rheostat 87 minus the voltage across resistor 54 is impressed on the control grid 103 of the master tube. Since lead 90 is positive with respect to lead 89, any decrease in armature voltage will result in a decreased voltage on the grid of the master tube and, therefore, in a decrease in the plate current through this tube. This decrease in plate current results in a reduced voltage drop across the load resistor 83 and causes the anode of tube 103 to go more positive in potential. Since the anode is connected through resistor 82 and lead 81 to the phase shift transformer 73 of the armature rectifier tubes, this positive shift in potential advances the phase of the grid voltage of the armature rectifiers and causes these rectifiers to fire earlier in the cycle thus increasing the armature voltage impressed on the motor. This action is entirely automatic and causes the motor to accelerate to a speed determined by the selected setting of the speed control rheostat 87.

As explained above, the voltage derived from current transformer 58 and impressed through rectifier 61 on the portion of rheostat 64 between the appertaining slider and the adjacent resistor 104 is proportional to the motor armature current. This voltage is introduced directly in the grid circuit of the master tube 102 and introduces a corrective action which, by adjusting the slider of rheostat 64, can be made to compensate for the IR drop in the armature circuit so that the motor operates with an essentially flat speed-load characteristic.

It will be understood from the foregoing that at the moment when, due to the actuation of "forward" contact 34, the contactor FCR picks up, the motor is subjected to an increasing armature voltage and starts accelerating up to a subsequently regulated speed determined by rheostat 87. During the accelerating period, the armature current might reach high peak values damaging to the armature rectifier, and the rate of acceleration might be too fast for the equipment to be driven. Therefore, a current limit and acceleration control is desired to prevent such detrimental occurrences.

The above-described system incorporates two component devices that secure such a limiting control. One device includes the capacitor 111 (.1 mfd.) and serves to prevent high current peaks during the initial starting period. The other limit device includes the transformer 58 and rectifier 61 with rheostats 63, 64 and serves to control the acceleration during the subsequent, major portions of the starting period and to prevent overload currents during continuous operation of the motor.

Referring first to the current limiting function of the capacitor 111, it will be noted that this capacitor is shorted through contacts 18 and 43 when the armature circuit is open and the motor at standstill. At the moment when the contactor FCR closes, the short circuit across capacitor 111 is eliminated and the capacitor is now connected in series with resistor 112 (47,000 ohms) between the control grid 103 and the anode of the master tube 102. As explained above, the grid voltage of master tube starts declining at the same moment and causes the voltage drop in plate load resistor 83 to also decline in order to advance the firing point of the armature rectifiers. However, the capacitor 111 is now subject to the voltage between grid and anode and starts changing. The change thus drained into capacitor 111 delays the decline in grid voltage and, consequently, also delays the advance of the firing points of the armature rectifiers. As a result the rate of current increase in the armature circuit during the initial portion of the starting period is reduced. This effect ceases when the capacitor is substantially fully charged, but the time constant of the capacitive circuit (111, 112) can readily be chosen to suffice for preventing the high initial current peaks that would otherwise occur immediately subsequent to the starting moment.

Thereafter the second and permanently effective current limit device takes over to limit the acceleration of the motor and to prevent overloads in the following manner. As, during the starting period, the current in the armature gradually increases, the current through rheostats 63 and 64 increases in direct proportion. The slider on rheostat 64 is connected to the grid 103 of the master tube 102, and the slider on rheostat 63 is connected to the cathode of a glow-discharge tube 106 (type OD3). When the sliders on these two rheostats have a difference of potential equal to the breakdown voltage of the glow tube 106, this tube becomes conductive, thus connecting the slider of rheostat 63 to the cathode of the master tube 102 through a constant difference of potential in tube 106. Any further increase in the voltage difference between the sliders on rheostats 63 and 64 will force the grid 103 of the master tube to go more positive, thus increasing the plate current of the master tube which increases the voltage drop across the resistor 83 and causes the lead 81 connected to the grids of the armature rectifier tubes 11, 12 to go negative, thus reducing the voltage and current of the armature circuit. This current limit action secures a smooth acceleration and prevents excessive overloads.

The drive is stopped by actuating the "stop" contact 36. This causes first the relay 1CR and then the contactor FCR to drop out. When contactor FCR opens, it is desirable to have the grids of the armature rectifier tubes negative in order to block the tubes. This is accomplished by shorting the capacitor 111 through the auxiliary contact 18 of contactor FCR. This connects the grid 103 of the master tube 102 to the anode, thus forcing the tube 102 to carry high plate current and to increase the voltage drop in resistor 83, making the grid lead 81 of the armature rectifiers go negative.

The capacitor 111 and the resistor 112 also provide a negative feed-back circuit which smooths out any oscillating components in the plate current of the master tube. This is due to the fact that the feed-back circuit (111, 112) reduces the gain of tube 102 as an alternating-current amplifier but does not disturb its action as a direct-current amplifier. Consequently, the unidirectional magnitudes of the resultant grid voltage applied to tube 102 are amplified to a much larger extent than any voltage ripples. In this manner, the stability of the control and regulating performance is greatly improved and a good tube balance is obtained at all speeds and loads of the motor. The above-explained features involving the capacitor 111, resistor 112 and contact 18 we also disclosed in the copending application Serial No. 25,156, filed May 5, 1948, of J. G. Haneiko, now Patent 2,488,536, assigned to the assignee of the present invention.

If a load is suddenly applied to the motor causing the armature current to increase suddenly, there is, of course, an increase in the current in the secondary 59 of transformer 58. However, the voltage across the potentiometer rheostats 63 and 64 does not increase the same rate because of the filtering action of the capacitor 60 (2mfd). This time delay effect would make for sluggish response of the unit to sudden increases in load. Such a slowdown in response, however, is compensated by the capacitor 66 (.1 mfd) which is an anticipating or positive feedback as far as current is concerned. As the current in rheostats 63 and 64 increases, the capacitor 66 varies its charge and thereby changes the voltage across the resistor 65. Thus the grid 103 of tube 102 is forced negative thus calling for more armature voltage and, of course, more current. Conversely, a rapid decrease in armature load causes the capacitor 66 and resistor 65 to force the grid 103 of tube 102 positive, thus calling for less armature voltage and, therefore, current. By the proper selection of the value of capacitor 66 and the settings of rheostats 63 and 64, a rapid response can be obtained without difficulties due to hunting. This system component is also disclosed in the copending application, Serial No. 25,155, filed May 5, 1948, of J. G. Haneiko, now U. S. Patent No. 2,516,568, assigned to the assignee of the present invention.

Reference is made in the foregoing to the actuation of the "forward" contact 34. When instead the "reverse" contact 35 is depressed, relay 2CR and contactor RCR pick up instead of relay 1CR and contactor FCR. As a result, the armature circuit is closed with reversed polarity of connection of the armature 6. The motor then runs in the reverse direction and the control and regulating performance is substantially the same as during the above-described forward operation. However, the relay 7CR is now also energized. As a result, speed control rheostat 87 becomes ineffective and speed control rheostat 88 is instead made active in the master tube grid circuit. Consequently, the motor will now run at a reverse speed determined by the setting of the slider in rheostat 88. It will be apparent that the forward and reverse speeds can thus be preset independently of each other.

In the foregoing, it is tacitly assumed that no change is made in the field excitation of the motor. In fact, however, the system of Figure 1 secures an increased range of speed change by controlling the field excitation in addition to the above-described armature current control. During the forward run of the motor, when relay 7CR is dropped out and its contact 45 closed, the grid circuit of the field rectifier 67 is under control by the rheostat 117. The forward speed thus also depends upon the positioning of the slider of rheostat 117. During the reverse run, when relay 7CR is picked up and contact 44 closed, the rheostat 116 is effective so that the reverse speed also depends upon the setting of the slider in rheostat 116. For low speeds, the rheostats 116 and 117 are preferably set to control rectifier 67 for full field excitation of the motor that then the speed control is effected only by changing the slider setting of rheostat 87 or 88. For higher speeds beyond the control range of rheostats 87 and 88, the rheostats 117 and 116 can be set to control the field rectifier 67 for applying a weakened motor field thus increasing the motor speed.

It will be noted that field control rheostats 116 and 117 derive this energization from the same direct-current source (93, 94, etc.) of constant voltage that also supplies energization to the control rheostats 87, 88 and to the plate circuit of the master tube 102. As a matter of fact this direct-current source is the only one used in the system for providing all constant direct-current voltages, including the bias voltage for the various tube grid circuits, needed in the system.

Figure 2:
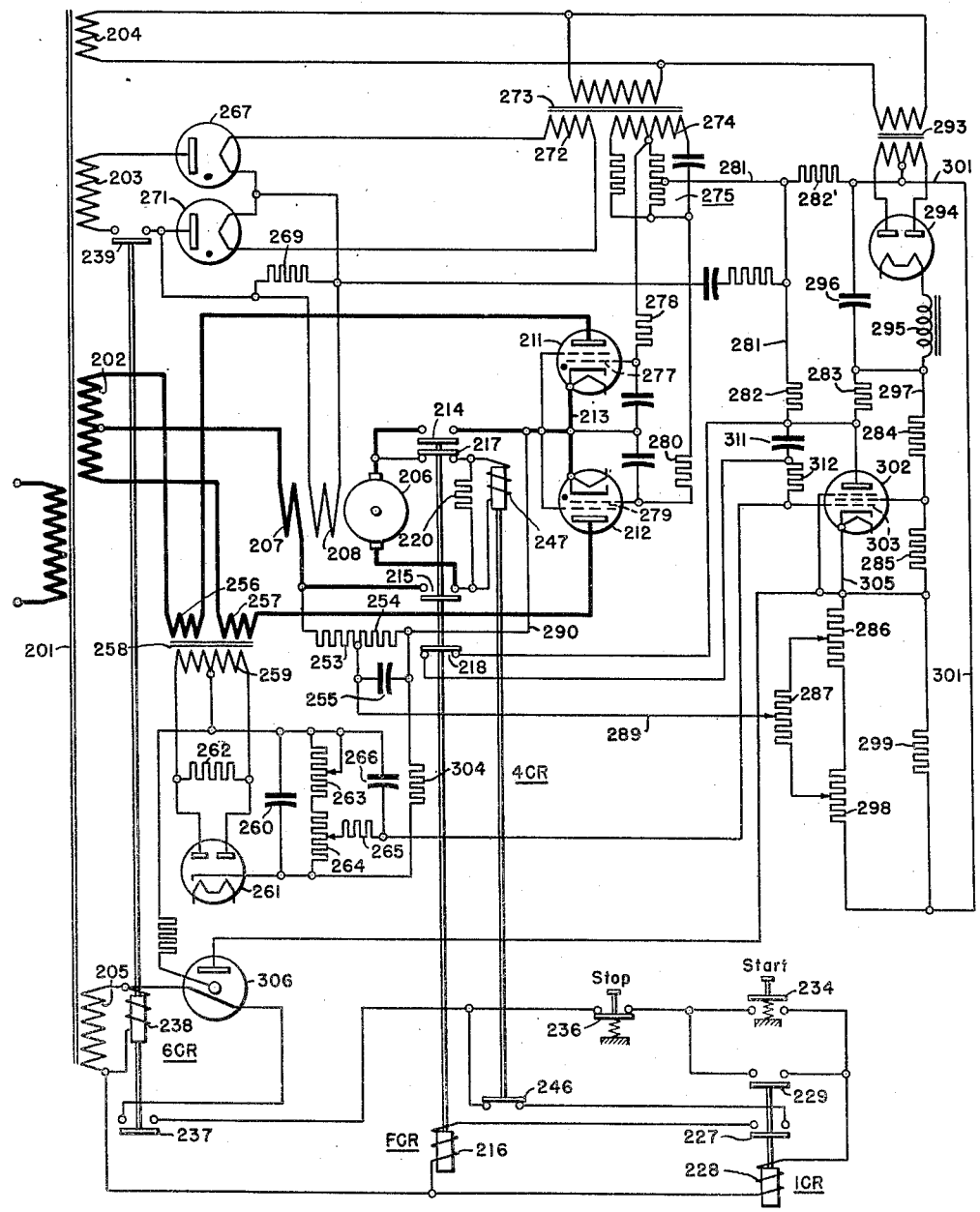
Fig. 2 shows a circuit diagram of another system for lesser requirement designed for non-reversible operation of the motor with non-controllable, i. e. constant field excitation.

The system shown in Fig. 2 is designed for non-reversible operation of a motor with a reduced range of speed control and constant field excitation. Therefore, in the system of Fig. 2, the reversing contactor RCR and appertaining relay 2CR and reverse push-button contact 35 shown in Figure 1 are omitted; and all elements appertaining to the field control of Figure 1, i. e., the contactor 7CR, the field rheostats 116, 117 and the field rectifier grid circuit, are also omitted. Aside from these simplifications, the system of Fig. 2 is similar to that of Figure 1. The system elements denoted in Fig. 2 by reference numerals between 201 and 299 correspond respectively to the elements denoted in Figure 1 by numerals between 1 and 99; and the elements denoted in Fig. 2 by numerals between 301 and 312 correspond to respective elements denoted in Figure 1 by numerals between 101 and 112. Keeping this in mind, the design of the system of Fig. 2 will be understood from the foregoing detailed description of Figure 1 so that it suffices to mention the essential performance and salient features of the simplified system.

The relay 6CR, preferably a timing relay, picks up and closes contacts 237 and 239 whenever the power transformer 201 is energized. Contact 239 closes the field rectifier circuit so that the motor field winding 208 receives constant excitation through rectifier tubes 267 and 271 from the secondary 203 of transformer 201. Actuation of the start contact 234 causes relay 1CR to pick up and to seal itself in at contact 229. Contact 227 energizes coil 216 of the armature contactor FCR whose contact 217 opens the circuit of the dynamic braking resistor 220, while contacts 214 and 215 close the armature circuit. The armature then receives current through the rectifier tubes 211 and 212 from the secondary 202. This current is determined by the voltage conditions of the rectifier control circuit which includes the load resistor 283 in the plate circuit of master control tube 302 so that the firing angle and output current of the armature rectifiers depend upon the voltage drop across the resistor 283. This voltage drop is controlled by the grid circuit of tube 302 which extends between grid 303 and cathode lead 305 and includes a tapered-off portion of the speed control rheostat 287. Rheostat 287 provides an adjusted speed reference voltage in accordance with the desired motor speed. Included in the grid circuit is also the armature shunt resistor 254 which provides a voltage proportional to the armature voltage and opposed to the speed reference voltage. Also disposed in the grid circuit of tube 302 is a portion of rheostat 264 which is energized through rectifier 261 from the current transformer 258 and provides an IR drop compensating voltage. The speed of the motor is thus controlled and regulated in substantially the same manner as that of the motor in the system of Figure 1. Tube 306 and the associated circuit elements provide current limit and acceleration control. The tube 302 has a negative feed-back circuit between anode and control grid which includes the capacitor 311 and the resistor 312. Capacitor 311 is shorted through contact 218 when the motor armature circuit is open and starts changing at the starting moment. As a result, the phase position of the firing points of the armature rectifiers is delayed, thus preventing high initial peaks of starting current substantially as explained in connection with Figure 1. This effect lasts a few cycles until the capacitor is fully charged. Thereafter, the circuit of the glow tube 306 becomes effective to limit the armature current during accelerating and overload periods by conducting current whenever the voltage across the tube reaches its breakdown value.

Figure 3:
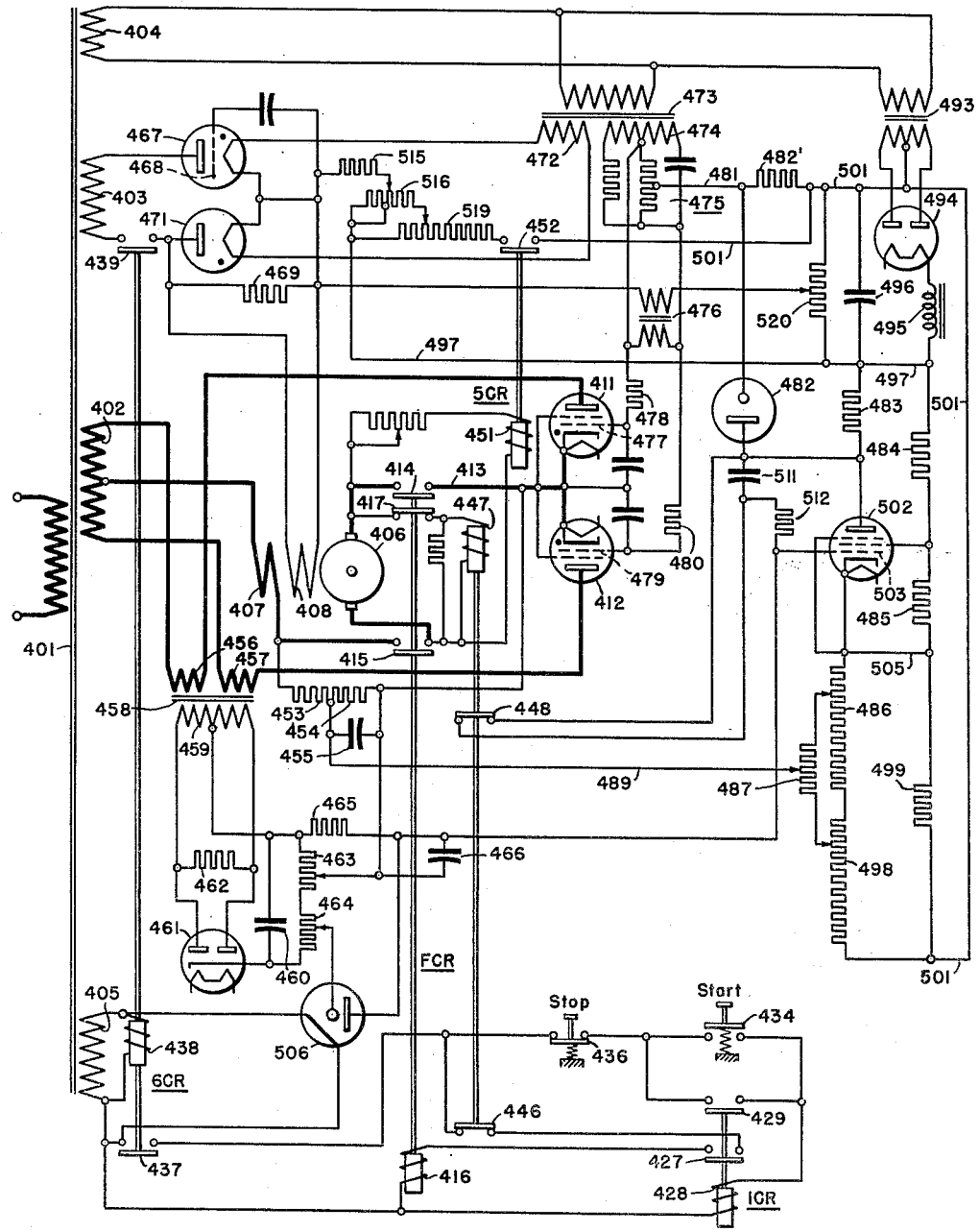
Fig. 3 shows diagrammatically the circuit of still another system for a non-reversible motor with field control.

The system shown in Fig. 3 provides an interrelated armature and field control largely similar to that in the system of Figure 1, but is designed for non-reversible operation of the motor and, in this respect, similar to the system of Fig. 2. Reference numerals between 401 and 520 in Fig. 3 denote elements corresponding to those respective elements in Figure 1 whose numerals, between 1 and 120, have identical last or last two digits. Due to these similarities, the design and performance of the system of Fig. 3 will to a large extent be understood from the foregoing description of Figure 1 so that it suffices to refer in the following to salient differences and modifications embodied in the system of Fig. 3.

It will be remembered that in the system of Figure 1, a potentiometric circuit, composed of two series-connected resistors 82 and 82', extends between the anode side of the load resistor 83 of the master tube 102 and the negative end (lead 101) of the constant voltage supply in order to obtain positive and negative biases on the respective grids of the armature rectifier tubes 11, 12. This affords a very considerable simplification of the circuits because auxiliary bias supplies are unnecessary. It will be recognized that a similar potentiometric circuit is provided in the system of Fig. 2, where this circuit comprises the resistors 282 and 282' and extends between the anode end of the lead resistor 283 and the negative terminal lead 301 of the constant voltage supply. Turning now to the corresponding components of the system shown in Fig. 3, two series-connected potentiometric circuit elements 482 and 482' will again be recognized between the load resistor 483 of the master tube and the negative terminal lead 501 of the constant voltage supply. However, the element 482 in Fig. 3 consists in a cold-cathode tube of the voltage regulating type instead of the resistors 82 or 282 shown in Figure 1 or Fig. 2. The provision of a glow tube as a voltage-divider element in this particular place has the advantage that it reduces or substantially prevents the loss in amplification otherwise caused by the potentiometric connection.

Another modification shown in Fig. 3 concerns the connections of the current limit control tube 506 with the grid circuit of the master tube 502 and with the potentiometric rheostats 463 and 464 of the current responsive voltage supply. According to Fig. 3, and in distinction from the corresponding tubes 106 and 306 in respective Figs. 1 and 2, the glow tube 506 has its anode connected with the control grid 503 of the master tube 502, while the cathode is connected to the slide contact or tap point of rheostat 464. Under steady operating conditions, only the voltage drop across part of rheostats 463 is effective in the master tube grid circuit to provide IR drop compensation, while the tube 506 is non-conductive. During acceleration and overload periods, however, the voltage across tube 506 reaches the breakdown value so that the tube becomes conductive and connects the grid 503 of master tube 502 to the more positive tap point of rheostat 464. Then the master tube is caused to delay the firing points of the armature rectifier tubes 411, 412. If an increased response of the current limit control to changes in armature current is desired, an anticipating or positive feed-back capacitor may be added as in the systems of Figs. 1 and 2. Such a capacitor is shown in Fig. 3 at 466.

It will be obvious that some of the above disclosed aspects and features of the invention are applicable in control systems other than for motor control. It is also apparent from the foregoing that the invention permits of various alterations and modifications and it will be understood by those skilled in the art that the invention may be embodied in systems or apparatus other than those specifically shown or described in this disclosure, without foregoing the essential objects and advantages of the invention and without departing from its essence or from the scope of the claims annexed hereto.

We claim as our invention:

1. An electronic motor control system, comprising a motor circuit to be energized, alternating-current supply means, a discharge rectifier connecting said motor circuit with said supply means and having a control circuit for controlling the current flowing through said rectifier, an amplifier having an output circuit connected with said control circuit to supply it with variable control voltage and having an input circuit for controlling said voltage, said input circuit having a constant-voltage source for providing adjustable speed-reference voltage and variable-voltage supply means for providing speed-responsive voltage in opposition to said reference voltage, current-responsive voltage supply means connected with said motor circuit for providing a voltage substantially proportional to said current, a cold-cathode tube connected to said current-responsive voltage supply means to become conductive when said current reaches a given magnitude, said tube being also connected with said input circuit to cause said amplifier to control said rectifier to limit said current when said tube is conductive.

2. In combination, a direct-current motor having field means and an armature, alternating current supply means, a discharge rectifier connecting said armature with said supply means and having a control circuit for controlling the armature current, an amplifier having an output circuit connected with said control circuit to supply it with variable control voltage and having an input circuit for controlling said voltage, a resistor connected across said armature and disposed in said input circuit to provide said input circuit with first component control voltage proportional to the armature voltage, an adjustable constant-voltage source connected with said input circuit to provide it with a second component control voltage in accordance with the desired motor speed and opposed to said first component voltage, current-responsive voltage supply means connected with said armature to provide a third component voltage dependent upon said armature current and having resistance means disposed in said input circuit to provide IR drop compensation, and a glow discharge tube of a given breakdown voltage connected to said current-responsive voltage supply means to become conductive only when said current reaches a given limit value, said tube being connected with said input circuit for causing, when conductive, said amplifier to control said rectifier to limit said current.

3. In combination, a direct-current motor having field means and an armature, alternating current supply means, a discharge rectifier connecting said armature with said supply means and having a control circuit for controlling the armature current, an amplifier having an output circuit connected with said control circuit to supply it with variable control voltage and having an input circuit for controlling said voltage, current-responsive voltage supply means connected with said armature and having potentiometric resistance means for providing across said resistance means a voltage substantially proportional to said current, said resistance means having a tapped portion, a resistor series-connected in said input circuit, a capacitor loop-connected with said resistor and said tapped portion, and a glow-discharge tube of a given breakdown voltage having a plate circuit connected across part of said resistance means to become conductive when said current exceeds a given limit value and connected with said input circuit for causing, when conductive, said amplifier to control said rectifier to limit said current.

4. An electronic motor control system, comprising a motor circuit to be energized, alternating-current supply means, a discharge rectifier connecting said motor circuit with said supply means and having a control circuit for controlling the current flowing through said rectifier, an amplifier having an amplifier tube with a plate circuit connected to said control circuit to provide it with variable control voltage, said tube having a grid circuit with grid voltage means for controlling said control voltage, said grid voltage means comprising a current-responsive source of direct-current voltage connected with said load circuit to provide a voltage substantially proportional to said current and having a resistance member in common with said input circuit, and a glow discharge tube of a given breakdown voltage having a cathode connected to the negative end of said source and an anode connected to a point of said input circuit at the amplifier cathode side of said resistance member so that said tube becomes conductive and controls said amplifier to prevent increase of said current when said current exceeds a given limit value.

5. A motor control system, comprising an armature circuit having alternating-current supply means and a discharge device with a control circuit for controlling the current in said circuit, an amplifier tube having a plate circuit coupled with said control circuit to provide it with variable control voltage and having a grid circuit for controlling said voltage, a feed-back circuit having a capacitor and a resistor series connected across the anode side of said plate circuit and the grid side of said grid circuit, a contactor disposed for opening and closing said armature circuit and having a contact closed across said capacitor when said armature circuit is open for causing said capacitor to start charging at the closing moment of said armature circuit in order to limit initial starting current peaks in said armature circuit, current limiting means having current-responsive voltage supply means connected with said armature circuit to provide a voltage substantially proportional to the armature current and having a normally non-conductive glow discharge tube connected to said voltage supply means to become conductive when said current reaches a given limit value, said glow discharge tube being connected to said grid circuit for causing said amplifier tube to prevent increase of said current when said tube is conductive, said feed-back circuit and said current limiting means having respective time constants rated relative to each other so that during starting periods said current limit means become operative after said capacitor is substantially fully charged.

6. An electronic control system, comprising a load circuit having alternating-current supply means and having a discharge device with a control circuit for controlling the current flowing through said device, constant-voltage supply means, an amplifier tube having a plate circuit connected to said voltage supply means to be energized therefrom, a load resistor series-connected in said plate circuit, a voltage divider connected in series with said load resistor across said voltage supply means, said control circuit extending in series through said load resistor and an adjacent portion of said voltage divider so as to be impressed by a polarity-reversible bias voltage for said discharge device depending upon the voltage drop of said load resistor, said tube having a grid circuit with variable grid voltage supply means for controlling said voltage drop.

7. An electronic control system, comprising a load circuit having alternating-current supply means and having a discharge device with a control circuit for controlling the current flowing through said device, constant-voltage supply means, an amplified tube having a plate circuit energized from said voltage supply means and including a load resistor, a voltage divider connected between a point of said plate circuit at the anode side of said load resistor and a negative terminal point of said voltage supply means, said voltage divider having an intermediate potential point and said control circuit extending in series through said load resistor and the adjacent portion of said voltage divider to said intermediate point, said tube having a grid circuit with variable grid voltage supply means for controlling the voltage drop across said load resistor.

8. An electronic control system, comprising a load circuit having alternating-current supply means and having a dicharge device with a control circuit for controlling the current flowing through said device, constant-voltage supply means, an amplifier tube having a plate circuit connected to said voltage supply means to be energized therefrom, a load resistor series-connected in said plate circuit at the anode side thereof, a voltage divider connected between a point of said plate circuit at the anode side of said load resistor and a point of said voltage supply means more negative than its negative junction point with said plate circuit, said control circuit extending in series through said load resistor and an adjacent portion of said voltage divider so as to be impressed by a polarity-reversible bias voltage for said discharge device depending upon the voltage drop of said load resistor, said tube having a grid circuit with variable grid voltage supply means for controlling said voltage drop.

9. An electronic control system, comprising a load circuit having alternating-current supply means and having a discharge device with a control circuit for controlling the current flowing through said device, constant-voltage supply means, an amplifier tube having a plate circuit connected to said voltage supply means to be energized therefrom, a load resistor series-connected in said plate circuit, a voltage-regulating glow tube and resistance means series connected with each other across a point of said plate circuit and a negative terminal point of said voltage supply means so that said glow tube is adjacent to said load resistor, said control circuit extending in series through said glow tube and load resistor.

10. An electronic control system, comprising a load circuit having alternating-current supply means and having a discharge device with a control circuit for controlling the current flowing through said device, constant-voltage supply means, an amplifier tube having a plate circuit connected to said voltage supply means to be energized therefrom, a load resistor series-connected in said plate circuit, a voltage divider connected between a point of said load resistor and a point of potential of said voltage supply means and having a voltage-regulating glow tube adjacent said load resistor, said control circuit extending in series through said glow tube and said load resistor so as to be impressed by a polarity-reversible bias voltage for said discharge device depending upon the voltage drop of said load resistor, said tube having a grid circuit with variable grid voltage supply means for controlling said voltage drop.

11. A motor control system, comprising a direct-current motor, alternating-current supply means, a discharge rectifier connected between said motor and said supply means and having a control circuit for controlling the current supplied to said motor, alternating-voltage bias supply means connected with said control circuit, constant-voltage supply means, an amplifier tube having a plate circuit connected to said voltage supply means to be energized therefrom, a load resistor series-connected in said plate circuit, a voltage divider connected between a point of said load resistor and a point of potential of said voltage supply means more negative than the negative junction of said voltage supply means with said plate circuit so that said voltage divider and said load resistor are connected in series with each other across said voltage supply means, said grid circuit extending series through said load resistor and an adjacent portion of said voltage divider, said amplifier tube having a grid circuit comprising a speed control rheostat to provide a reference voltage and speed-responsive voltage means to provide a voltage in opposition to said reference voltage whereby said motor is controlled to run at a speed determined by said reference voltage.

WALTER G. ROMAN.
RICHARD C. CUNNINGHAM.

REFERENCES CITED

The following references are of record in the file of this patent:

UNITED STATES PATENTS

| Number | Name | Date |
|---|---|---|
| 1,962,344 | Geiselman | June 12, 1934 |
| 2,210,715 | Gulliksen | Aug. 6, 1940 |
| 2,248,929 | Adler | July 15, 1941 |
| 2,422,567 | Puchlowski | June 17, 1947 |
| 2,459,340 | Reeves | Jan. 18, 1949 |